J. E. EAGLES.
AUTOMOBILE HEADLIGHT CONTROL.
APPLICATION FILED MAR. 31, 1920.
1,374,912.
Patented Apr. 19, 1921.
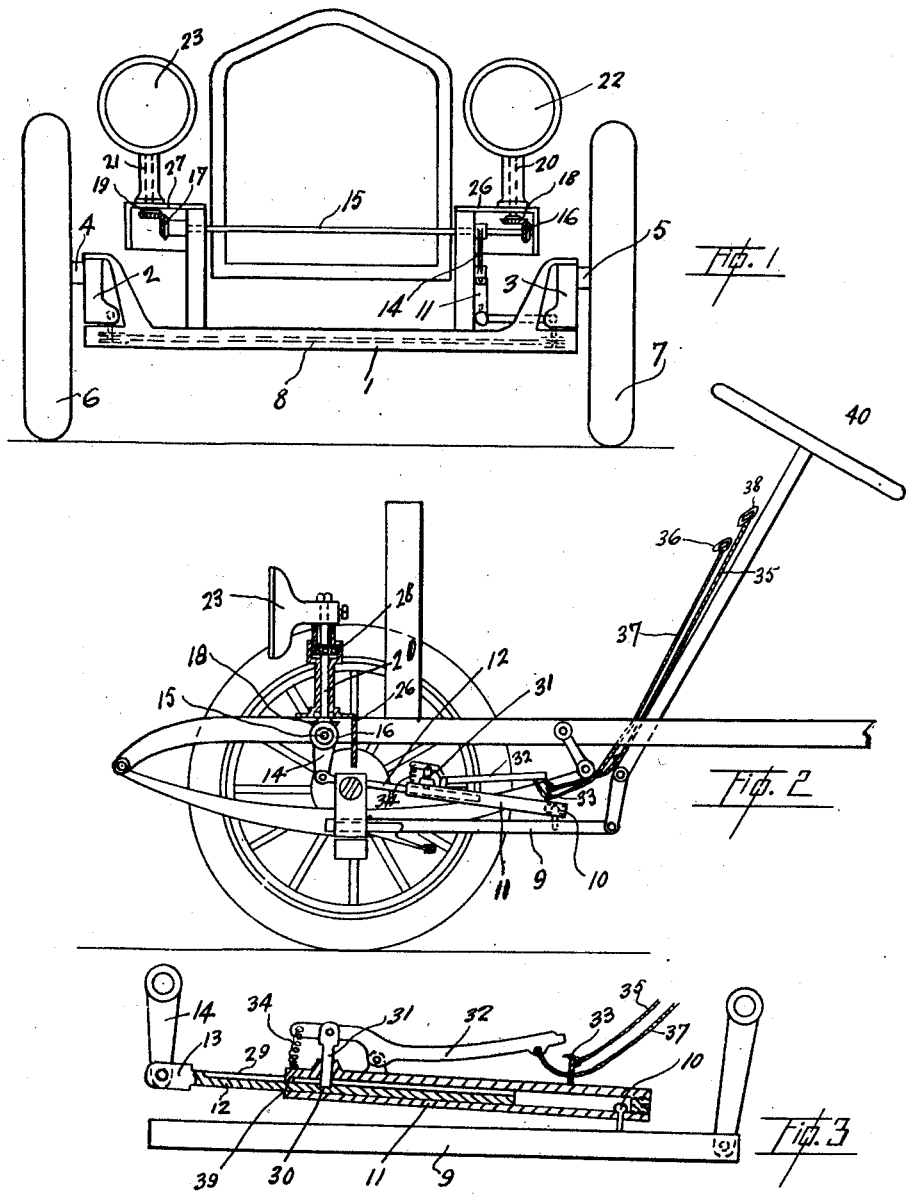
INVENTOR
John Edmund Eagles
BY
ATTYS.

UNITED STATES PATENT OFFICE.

JOHN EDMUND EAGLES, OF NEW WESTMINSTER, BRITISH COLUMBIA, CANADA.

AUTOMOBILE HEADLIGHT CONTROL.

1,374,912. Specification of Letters Patent. Patented Apr. 19, 1921.

Application filed March 31, 1920. Serial No. 370,249.

*To all whom it may concern:*

Be it known that I, JOHN EDMUND EAGLES, a subject of the King of Great Britain, and a resident of the city of New Westminster, in the Province of British Columbia, Canada, have invented certain new and useful Improvements in Automobile Headlight Controls, of which the following is a specification.

My invention relates to improvements in headlight controls for automobiles, and the object of my invention is to provide a simply constructed device of this nature adapted to be readily and easily installed at a low cost the use of which enables the lamps to turn automatically with the car so that they are always positioned parallel with the front wheels and thus the light is directed at all times on the road whether running straight ahead, turning bends or corners, or turning out when meeting a coming car, thereby rendering night driving much safer than when the lamps are not so turnable. A further object is to provide means whereby the device may be rendered inoperative at will as regards the turning of the lamps when they are not required to do so, as in the day time.

I attain these objects by the construction illustrated in the accompanying drawings in which:

Figure 1 is a front end view of an automobile with which my device is embodied.

Fig. 2 is a side view of the device.

Fig. 3 is a detail view, in part section, of the operating rod and sleeve.

Similar figures of reference indicate similar parts throughout the several views.

1 indicates the front axle of the automobile on the opposite ends of which are the knuckle joints 2 and 3 carrying the spindles 4 and 5 on which the wheels 6 and 7 are rotatably mounted, the knuckles being connected by the connecting rod 8 and operated by means of the steering rod mechanism and rod 9, all of the foregoing construction being found generally in automobiles in present use.

To the rod 9, which it will be understood is longitudinally movable, being actuated by the steering rod and its associated mechanism, is connected adjacent its rear end by a ball connection 10 a sleeve 11 in the bore of which is slidably mounted a rod 12 jawed at its outer end, as at 13, which jaw is connected to a lever 14 secured to a rotatable shaft 15 extending transversely of the vehicle, which shaft is provided at each end with bevel gears 16 and 17 meshing with gears 18 and 19 secured to the lower ends of vertical shafts 20 and 21 on the upper ends of which are secured the headlights 22 and 23, these shafts being mounted in suitable columns 24 and 25 secured to the casings 26 and 27 bolted or otherwise attached to the chassis, these casings forming protective covers for the gears just mentioned. The shafts 20 and 21 rotate on ball bearings, as indicated at 28 in Fig. 2.

The rod 12 is slotted throughout its length, as at 29, and at a suitable point in the length of the slot a hole or depression 30 is provided in which engages the point of a pin member 31 vertically movable through the wall of the sleeve 11, the upper end of this pin being connected to a lever 32 fulcrumed on the sleeve the long end of which lever extends adjacent to a trip member 33 secured to the sleeve while its short end is connected to the sleeve by a tension spring 34. A flexible connection 35 is secured at one end to the long arm of the lever 32 while its free end is passed through an opening in the trip member 33 and carried up to a suitable point adjacent the steering column and within easy reach of the driver, being provided with a handle while a second flexible connection 37 is carried from the trip member 33 to the same point and also provided with a handle 38. The sleeve 11 is provided with a square portion 39 normally engaging slidably the slot 29 of the rod 12, so that the turning of the sleeve during operation is thus prevented.

The manner in which the device operates and its utility will be apparent, on reference being had to the drawings. On moving the steering wheel, indicated by the numeral 40, in either direction, the rod 9 is moved forward or backward according to the direction of rotation of the steering wheel, thus also moving the sleeve 11 and also the rod 12, which is normally locked to the sleeve by the engagement of the pin 31 in the depression 30, so that the transverse shaft 15 is moved to swing the lamps toward the right or left as the case may be. Should it be desired, however, that the lamps remain stationary during the steering operations, as during the day, for instance, the flexible connection 37 is drawn upwardly thus drawing downwardly the long arm of the lever 32 the extremity of which trips and engages under the trip member 33 to be held down thereby so that the pin 31 is raised out of the depression 30, the sleeve 11 then sliding freely along the rod 12 as the steering wheel is rotated without actuating the rod so that while the wheel may be operated the lamps in this case remain stationary.

From the foregoing it will be seen that I have devised a highly practical and efficient means for moving automobile headlights to the right or left coincidently with corresponding movement of the steering wheel and which may be rendered inoperative when desired to permit the wheel to be operated without affecting the headlights.

What I claim as my invention is:

1. A dirigible headlight operating means comprising a pair of slidably engaged members, a pin slidable through one of said members and normally engaged with the other member to restrain said members from relative sliding movement, a lever pivotally connected to the pin and mounted on that member through which the pin extends, a resilient connection between said lever and its supporting member located on one side of the lever pivot, and means connected to said lever on the opposite side of the pivot to move the lever against the resistance of said resilient connection.

2. A dirigible headlight operating means comprising a hollow member, a second member slidably engaged in said hollow member and provided with a depression, a pin slidable through the hollow member and engageable in said depression to lock the members together, a lever pivotally connected to said hollow member and carried thereby, said lever having one end thereof pivotally connected to said pin and resiliently connected to said member, a spring latch carried by said hollow member and engageable with the opposite end of the lever to maintain the latter in a pin retracting position, and means for moving said lever to a pin retracting position and into engagement with said latch.

Dated at Vancouver, B. C. Canada, this 11th day of March, 1920.

JOHN EDMUND EAGLES.